(12) United States Patent
Bhakta et al.

(10) Patent No.: US 7,474,889 B2
(45) Date of Patent: Jan. 6, 2009

(54) INFORMING WIRELESS DEVICE USERS OF INCOMING CALLS OR PAGES IN ENVIRONMENTS INHOSPITABLE FOR NOTIFICATION

(75) Inventors: Dharmesh N. Bhakta, Austin, TX (US); Walter Chun-Won Lee, Cedar Park, TX (US); Kumar Ravi, Cedar Park, TX (US); Eric Siegfried Rybczynski, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 374 days.

(21) Appl. No.: 11/214,565

(22) Filed: Aug. 30, 2005

(65) Prior Publication Data

US 2007/0049255 A1 Mar. 1, 2007

(51) Int. Cl.
*H04M 1/725* (2006.01)
(52) U.S. Cl. .................. 455/412.2; 455/413; 455/412.1; 455/466; 455/415; 455/418
(58) Field of Classification Search .............. 455/412.2, 455/413, 412.1, 466, 415, 418
See application file for complete search history.

(56) References Cited

U.S. PATENT DOCUMENTS 7,076,267 B2 * 7/2006 Vander Veen et al. .... 455/550.1

| 2002/0098831 | A1* | 7/2002 | Castell et al. ............... 455/413 |
|---|---|---|---|
| 2003/0190934 | A1 | 10/2003 | Chen |
| 2004/0032484 | A1 | 2/2004 | Halttunen |
| 2004/0176031 | A1 | 9/2004 | Haller et al. |
| 2004/0203353 | A1 | 10/2004 | Connor |
| 2004/0204153 | A1 | 10/2004 | Benco et al. |
| 2006/0025141 | A1* | 2/2006 | Marsh et al. ................ 455/445 |

FOREIGN PATENT DOCUMENTS

| EP | 1 059 809 A2 | 12/2000 |
|---|---|---|
| JP | 02-202278 | 8/1990 |
| JP | 2002-359670 | 12/2000 |
| JP | 2001-251449 | 9/2001 |
| JP | 2002-101457 | 4/2002 |

OTHER PUBLICATIONS

"Original Blend Drink At Vending Machine (bmp)"; IBM Research Disclosure; Feb. 2002; pp. 282-283.

* cited by examiner

*Primary Examiner*—Sanh Phu
(74) *Attorney, Agent, or Firm*—Herman Rodriguez; The Brevetto Law Group, PLLC; Scott Charles Richardson

(57) ABSTRACT

Methods 300 and systems 100 are provided for notifying a mobile telephone user of an incoming call in a loud ambient environment. A call notification system registers mobile devices located within the boundary of the area it serves, and couples to the mobile devices using a short range communication technology such as Bluetooth. Upon detecting an incoming call, the mobile device alerts the notification system after a predetermined number of rings. After a predetermined number of rings the notification system, in turn, presents an incoming call notification using visual cues or audio cues to catch the user's attention.

20 Claims, 3 Drawing Sheets

INFORMING WIRELESS DEVICE USERS OF INCOMING CALLS OR PAGES IN ENVIRONMENTS INHOSPITABLE FOR NOTIFICATION

BACKGROUND

1. Field

The present embodiments relate generally to wireless communications, and more specifically to systems and methods for receiving an incoming wireless communication.

2. Background

Within the last decade wireless telephones and pagers have rapidly become commonplace in business settings and for personal use. Many people carry their cellular telephones with them at all times. In noisy environments such as nightclubs or concerts it can be difficult to hear the cellular telephone ringing. This results in calls sometimes being missed in noisy environments due to the loud ambient noise level. In some situations incoming calls can sometimes be missed even though the user's cellular phone or pager is set to vibrate when a call is received. For example, a person on the dance floor in a nightclub may fail to detect an incoming message on a vibrating pager or cell phone due to the movements of the dance.

What is needed is a way to alert a mobile device user or pager user of an incoming wireless communication in a noisy ambient environment.

SUMMARY

Embodiments disclosed herein address the above stated needs by providing systems and methods for a call notification system to alert the user of a mobile device of an incoming call from a wireless communication system. The call notification system includes an access point configured to establish a second wireless communication link with the mobile device and one or more notification devices such as display screens or speakers which are configured to present the notification message of an incoming call. The notification system also has a controller connected to both the access point and to the notification devices to control them.

Another embodiment provides a method for indicating an incoming call for a mobile device which includes a call notification system detecting a mobile device coupled to a wireless communication system via a first wireless communication link. A wireless communication link is established between the mobile device and the call notification system, the mobile device registering to receive and receiving data from the communication system indicating an incoming call. The mobile device rings in response to receiving the data, and instructs the call notification system to wait a predetermined number of rings before displaying the notification of the incoming call.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

The following description of the various exemplary embodiments is illustrative in nature and is not intended to limit the invention, its application, or uses.

Figure 1:
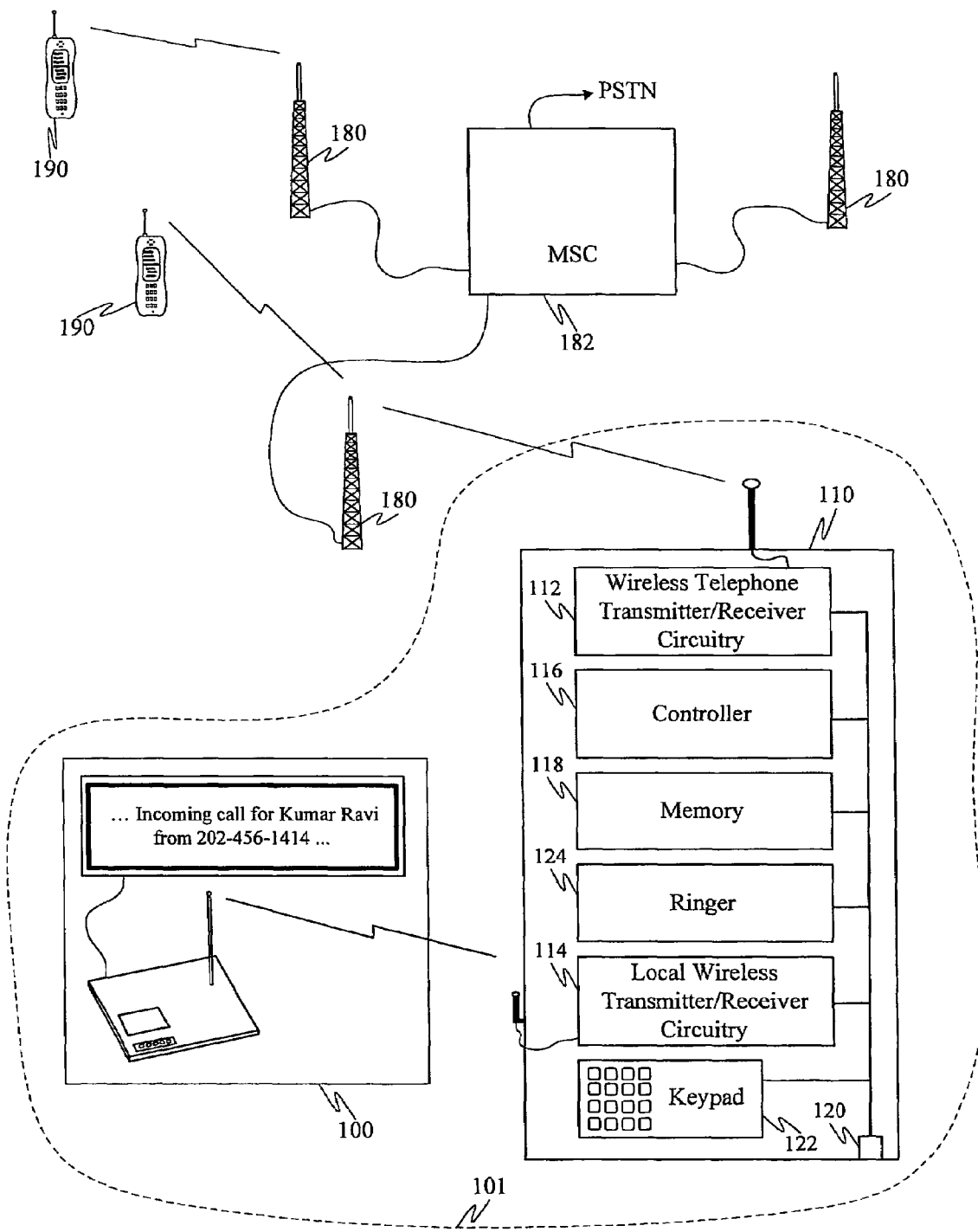
FIG. 1 depicts a call notification system according to the invention operating with a wireless communication system.

FIG. 1 depicts a mobile device 110 operating with a call notification system 100 to receive notification of incoming calls from a wireless communication system. The call notification system 100 is particularly useful in environments which are inhospitable for call notification, that is, in situations in which a user carrying a cell phone is not able to hear their phone ring even though the phone is in their possession or in the nearby vicinity. Such situations often occur in noisy ambient environments such as sports bars, nightclubs, at parties, or in an automobile with the stereo playing loudly. There are other factors which can create an environment inhospitable for call notification. For example, in some circumstances it may not be practical for people to carry their cell phones with them all the times, such as at swimming pools, hot tubs or while playing sports such as soccer, tennis or basketball. During activities such as these, the mobile device 110 may be left near the playing field or poolside or elsewhere in the vicinity, but too far away to hear it ringing. In noisy situations or instance where it is inconvenient to carry the mobile phone such as those listed above, there is often a problem of missing calls. The call notification system 100 may be implemented in quiet environments as well. For example, the call notification system 100 can be quite useful libraries, lecture halls, or possibly movie theaters where it is inappropriate to have cell phones ringing. In such situations the call notification system 100 may be implemented with a discrete visual alert only, and no audio notification, so as to alert, for example, library users of incoming calls without disturbing the silence of the library or an ongoing lecture. Another situation in which the call notification system 100 may be implemented with a discrete visual alert is during musical performances, for example, at the Metropolitan Opera House in the Lincoln Center at New York City. Users may be provided with individual screens to display a visual text message of incoming calls during operas or other concert performances (e.g., a small LCD screen on the armrest or the back of the seat in front of the user).

By using the notification system 100 a user may be informed of an incoming call using a visual display such as a marquee with a message of an incoming call or a television which scrolls a personalized message or provides a closed caption text type message. The notification system 100 may also alert a user of an incoming call using an audio signal such as a voice announcing the user's personalized message on a PA system or through the speakers of an audio system. FIG. 1 depicts a mobile device 110 configured for use with a wireless communication system and the notification system 100. The mobile device 110 may be a cellular telephone, a push-to-talk (PTT) radio handset, a wireless pager, a text messaging device, a personal digital assistant (PDA) with communication capabilities, or other such wireless communication device capable of conducting wireless communications. The mobile device 110 may also be called a mobile station. The wireless communication system may be a cellular telephone system, a paging system or other wireless system configured to carry on wireless communications with various embodiments of mobile devices 110. The wireless communications themselves may be digital or analog, and may be implemented using any of several encoding schemes or transmission technologies, e.g., FDMA, TDMA, CDMA, GSM, IP telephony through wi-fi, or a hybrid or these or other like schemes.

FIG. 1 depicts a number of cellular base stations 180 connected to a mobile switching center (MSC) 182 of the wireless communication system. Typically, the MSC 182, in turn, is connected to the public switched telephone network (PSTN). In some implementations of communication systems the landline portion of the communication link may pass through a portion of the Internet or another type of communications network. Other types and configurations of wireless communication systems known to those of ordinary skill in the art may be used to implement the various embodiments.

The mobile device 110 is wirelessly coupled to a base station 180 of the wireless communication system via a wireless communication link. The establishment of a wireless communication link means that the mobile device 110 is registered with the wireless system for communication purposes. A certain frequency range, timeslot or other measure of a wireless resource may be allocated to the mobile device 110, so as to allow the mobile device 110 to send and receive telephone calls, pages, text messages or data. The mobile device 110 is also configured to be wirelessly coupled to a call notification system 100 through a second, local wireless communications link. Typically, the local wireless link to the call notification system 100 uses Bluetooth, infrared, wi-fi or another short range wireless technology. Further details of the call notification system 100 are provided in FIG. 2.

The mobile device 110 includes transmitter/receiver circuitry 112 configured to wirelessly send and receive signals to and from the base station 180. The mobile device 110 also includes local wireless transmitter/receiver circuitry 114 configured to wirelessly send and receive signals to and from the call notification system 100. The memory 118 is configured to store the requisite logic and parameters to control the transmitter/receiver circuitry 112 and 114, access and control the memory 118, and control the other functions of the mobile device 110. The memory 118 is generally integrated as part of the mobile device 110 circuitry, but may, in, some embodiments, include a removable memory such as a removable disk memory, integrated circuit (IC) memory, a dongle, or the like. The controller 116 and memory 118 also implement the logic and store the settings, preferences and parameters for the call notification system 100. The controller 116 and memory 118 may be configured to format messages, for example, XML messages, for distribution purposes to be received by the call notification system 100 for translation to an audio and/or video format.

The mobile device 110 also has a microphone and speaker (not shown) for the user to speak and listen to callers. A keypad 122 is configured as part of mobile device 110 for dialing telephone numbers and entering data. Mobile devices 110 may be configured with a data input/output (I/O) port 120 for downloading data, programs and other information. In addition the mobile device 110 typically includes a ringer 124 for alerting the user to incoming calls or messages. The ringer may include a mechanism for vibrating or buzzing the handset, either in addition to the audible ring or in place of it. As used herein, the term "ringing" for a mobile device is meant to include buzzing or vibrating the mobile device as well as creating an audible telephone ringing sound.

The mobile device 110 of FIG. 1 is depicted within call notification boundary 101 which defines the area serviced by the call notification system 100. The local wireless transmitter/receiver circuitry 114 is coupled to the access point of call notification system 100 while the mobile device 110 is within the call notification boundary 101. As shown in the figure, the mobile devices 190 are not within the call notification boundary 101 and are not coupled to the access point of call notification system 100.

Figure 2:
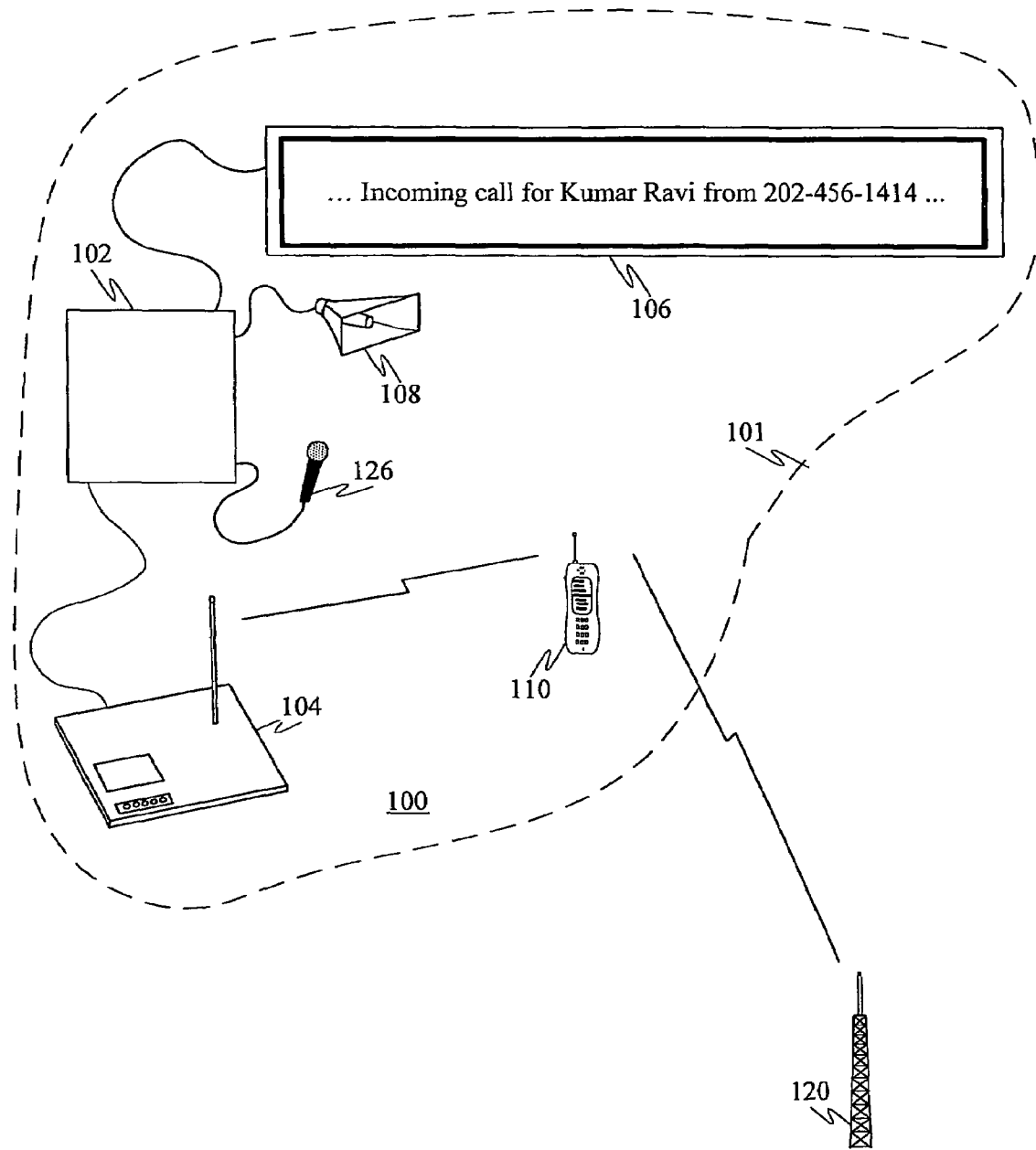
FIG. 2 depicts the call notification system.

FIG. 2 depicts some details of the call notification system 100. Various embodiments of the call notification system 100 enable a user to be informed of an incoming call by a visual cue (e.g., a marquee, scrolling messages on television or a projected image) or an audio cue (e.g., an announcement in the user's voice on a public address system indicating that the user's phone is ringing). When the ringer of mobile device 110 starts ringing and the user does not respond to the call within a preconfigured number of rings, if the user has programmed the device to provide notification through other means, the mobile device 110 sends a message on a second, local communication link (e.g., to a Bluetooth) which, in turn, causes the notification system 100 to present the message to catch the user's attention.

The call notification system 100 includes a local communication access point 104 for establishing a second, local communication link to the mobile device 110. The local communication access point 104 may use Bluetooth, infrared or wi-fi or other short range wireless technology. The local communication access point 104 may be a line-of-sight technology, or may be able to communicate through walls and around corners. The local communication access point 104 is connected, either hardwired or wirelessly, to a call notification controller 102. In some embodiments the second link may be a hardwired link rather than a wireless link. For example, if the call notification system 100 is implemented in a classroom lecture hall setting or a library where there are data ports available, the second link may be completed by plugging the mobile device 110 into a data port adapter located proximate the lecture hall desks or the reading tables of the library. Another example of a hardwired second link may be found in cases where the call notification system 100 is implemented near a swimming pool, a hot tub or other location where the mobile device 110 may easily be damaged by exposure to water or other elements such as dirt, mud, dust or extreme temperatures. In such settings the mobile device 110 may be plugged into hardwired cable in a waterproof box or other containing which is not susceptible to the elements. In such a way the second communication link may be established via a hardwired cable terminated in an enclosure designed to provide protection to the mobile device from the elements, e.g., water, steam, water vapor, extreme temperatures, or the like.

The call notification controller 102 includes logic and memories for controlling and communicating with the various parts of the call notification system 100 and controlling communications via the local communication access point 104. The call notification controller 102 may be embodied as a component of a personal computer, a microprocessor, or other forms of logic and circuitry. In some embodiments the call notification controller 102 may be configured to be a part of the local communication access point 104.

The call notification controller 102 is connected to one or more types of notification devices, such as notification displays 106 and/or notification speakers 108. A user may specify the type of notification to be employed, e.g., visible notification using notification displays 106 and/or audible notification using the notification speakers 108. The user may specify the type of notification to be employed during a negotiation and registration process which may take place when the user enters the call notification boundary 101 defining the area serviced by call notification system 100. In some embodiments it may not be necessary for the user to manually enter the type of notification devices to be employed during the negotiation and registration process. Such settings may be stored in the mobile device 110 as default settings. The callers associated with incoming calls may be recognized using caller ID. The various callers may be classified in different categories of priority or importance and accorded different types of notification (e.g., incoming priority calls, incoming standard calls, incoming non-notification calls, or the like). Depending upon the priority classification of an incoming caller the notification system 100 may use different types or combinations of the notification displays 106 and/or notification speakers 108 to notify the user of the call.

In various implementations the notification display 106 may be embodied as a text marquee monitor such as a large profile scrolling LED display, a television screen, a computer monitor (e.g., a CRT or LCD), a projection device, a laser beam writer for writing text on walls or ceilings, or other like type of display device. The notification display 106 may also be implemented as a laser device able to print text on a wall or ceiling, or perhaps even an animated icon likely to catch the user's attention. Laser text writers are useful in areas such as swimming pools and sporting facilities where an ordinary monitor could be subject to damage, for example, from exposure to water or the elements.

When employing a television screen as the notification display 106 the messages may be scrolled across the screen as closed captioned text. When using a notification display 106 to alert the user of an incoming call, a message may be displayed (e.g., "Incoming call for Kumar Ravi . . . "). The display 106 may project a personalized symbol or animated icon selected by the user during the registration process. The symbol any fanciful image likely to catch the user's attention, such as a playing card symbol for hearts, diamonds, etc., or an image of the user's college mascot running across the wall of the room holding a telephone. The displayed symbol may be the same for all incoming calls to a particular user of the mobile device 110, or may be varied prearranged manner to indicate the identity of the caller. For example, an incoming call from the user's wife may result in the queen of hearts playing card being displayed, but if the user's boss calls the display may show the king of clubs, thus providing to the user some personalized indication of the identify of the caller.

In a typical example, the mobile device 110 may be a cellular telephone, the access point 104 can be a Bluetooth receiver, and the notification displays 106 a television set. In this example, the user is in a sports bar where television 106 is attached to Bluetooth receiver 104 which also receives the TV 106 input. When the user's cell phone 110 rings and is not picked up within a certain number of rings, the phone 110 sends a signal including a preconfigured message to the Bluetooth receiver 104 attached to television 106. The controller 102 may be configured to reformat the TV monitor 106 to make room for a ticker at the bottom of the screen to display the preconfigured message such as: "Kumar—Your Cell phone is ringing" or if the calling party is part of a priority caller list: "Kumar—Get the Cell phone. Important caller."

The notification speaker 108 may be a loud speaker which projects sound into an entire room or other area, a plurality of smaller speakers distributed throughout the location (e.g., located one per dining room table), or may be interconnected into an existing intercom, public address system, loudspeaker system, or television audio system. In some embodiments the call notification controller 102 controls the notification speaker 108 to play a prerecorded message in the user's voice or another recorded voice chosen by the user. In another example, the user may be riding in a car with the stereo playing loudly. The controller 102 of a system 100 implemented in the car adjusts the background volume of the music and plays the user's pre-programmed voice message with a notification message to catch the user's attention.

The call notification system 100 may be implemented in a number of different settings to aid in notifying users of incoming calls. Noisy environments benefit from the call notification system 100. Some places may be noisy part of the time and quiet at other times. For example, the environment at a rock concert may be quite noisy during the performance, but the noise level abates after the performance and sometimes during intermissions. The call notification system 100 may be turned off during quiet times, or the notification options may be altered to conform to the environment. The call notification system 100 may include a microphone 126 or other sensor for detecting the ambient noise level (e.g., the noise level within the call notification boundary 101). In some embodiments, if the level reaches a predetermined threshold the call notification system 100 can be enabled, and if the noise level falls below the predetermined threshold the system can be disabled. The scheme for altering the notification options and setting the predetermined noise threshold may be included as part of the parameters and preferences for the system.

In some instances, the call notification system 100 is useful in quiet environments or noise conscious environments. For example, the call notification systems 100 may be implemented in lecture halls or libraries with a notification display 106, but not notification speakers 108, to alert library users of incoming calls without disturbing the silence or interrupting an ongoing lecture or presentation. The call notification system 100 is also useful in situations where it may not be possible, or is inconvenient, to carry a mobile device 110. Swimming pools, hot tubs, racquetball courts or other athletic facilities are examples of places where it is inconvenient to carry a mobile device 110. Call notification boundary 101 represents the local area within which the call notification system 100 is implemented. For example, boundary 101 may represent a nightclub, a sports arena, a library, or a swimming pool. At least one or more of the notification displays 106 and/or notification speakers 108 should be visible or within earshot of the mobile device user within boundary 101. Further, the mobile device 110 should be within the range of the local communication access point 104 so as to be able to establish and maintain a secondary, local communication link (e.g., Bluetooth) at points within the boundary 101.

Figure 3:
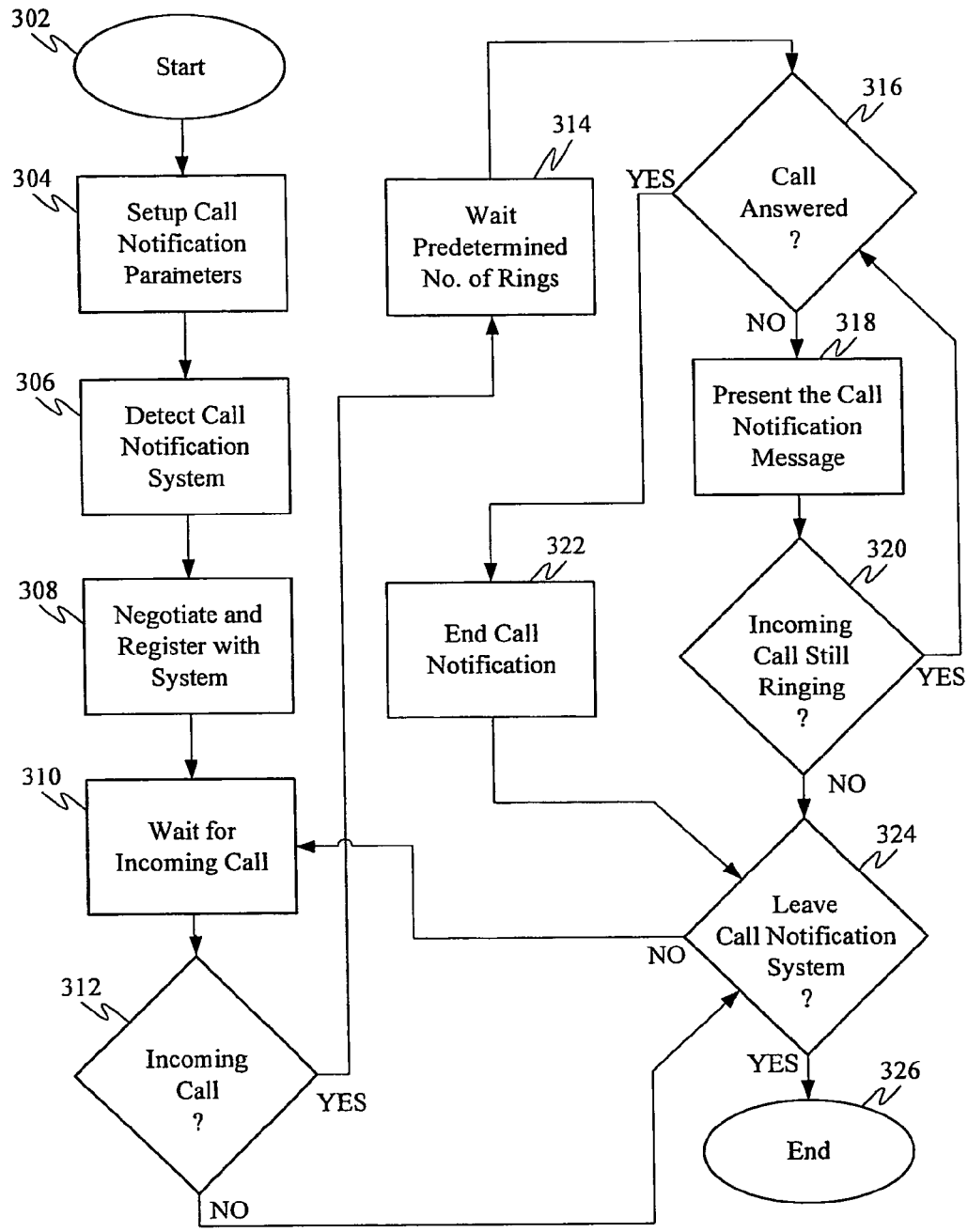
FIG. 3 is a flowchart illustrating a method of informing a wireless device user of an incoming call or page in a loud ambient environment in accordance with various embodiments of the invention.

FIG. 3 is a flowchart 300 illustrating a method of informing a wireless device user of an incoming call or page in a loud ambient environment in accordance with various embodiments of the invention. The method begins at 302, and proceeds to 304 where the parameters and preferences for the call notification system are set up. Typically, the parameters and preferences are stored within the mobile device 110, for example, in memory 118. In some embodiments, however, the parameters and preferences may also be stored in a memory within, or associated with, the call notification controller 102. This is useful for places that a person frequently visits such as the person's health club. Having the parameters and preferences stored within the call notification controller 102 allows the system to remember the setup with only the need to make modifications for updates or changed information.

The initial setup typically involves loading an application program and communication parameters in the mobile device 110. Once the application program has been loaded and is operational the user may enter preferences and store various caller information. The application program itself is loaded via the data I/O port 120 of the mobile device 110. The user preferences and caller information may be entered using the keyboard 122, or, if the data is in the proper format, it may be loaded via the I/O port 120. The caller information includes classes of callers whose incoming calls are to be treated differently. The classes of callers may include classifications with names such as priority callers, standard class callers, non-notification callers, or other such classifications. Priority callers may be people or business contacts who are important to the user, and thus warrant extra measures to ensure notification of incoming calls. The callers classified in the standard class are handled with notification services which are not as extensive as priority callers. The standard class may be used as a default class for incoming calls from numbers which are not recognized and may be treated with a default notification scheme. Incoming calls from the class of non-notification callers are not provided with any notification services. These classifications are merely exemplary. Other names may be used to group the various priority classifications of incoming callers. A priority classification, as used herein, is a group of incoming callers whose incoming calls are treated the same or have similar notification schemes associated with them. With regard to the term "incoming caller," it should be noted that an incoming caller is a person known to have called the user in the past or is likely to call the user in the future. Incoming callers may be identified to the notification system 100 by their caller ID. The notification system 100 may use the incoming caller's caller ID for the notification message, or may use an alias or any other name or symbol selected by the user and stored in the notification preferences.

In addition to specifying a classification for various incoming callers, the user may also record preferences for one or more notification schemes, that is, the various types of notification to be employed and the manner in which they are implemented. A user may specify visible using notification displays 106 or audible using the notification speakers 108, or a combination of both. The user may also specify that the same type of notification is to be employed for all the incoming calls, or the user may select different types of notification to be used for different classifications of callers (e.g., priority caller notification versus notification for non-priority callers). For example, a user may enter a business contact classifying the person as a priority caller and specify a notification scheme that alerts the user to incoming calls after two rings using the notification display 106, and then after four rings using both the notification displays 106 and the notification loud speaker 108. The same user may specify a notification scheme to handle incoming non-priority callers (e.g., standard classification or default notification) by using only the notification display 106 after three rings. Incoming calls from non-notification callers would not use either the notification displays 106 or the notification loud speaker 108.

The user may also specify and store preferences for the number of rings to wait before initiating the notification process, whether to use visual and/or audio notification, wheather the user wants a phone number to be displayed or prefers an alias or screen name, or other such options for the caller notification system. Users often frequent the same places on a regular basis such as a favorite bar or a particular health club or swimming pool. The stored options may have settings or preferences that are tied to particular places. For example, the preference settings enabled while the user is at a library may list the user's boss as a preferred caller, while the preferences enabled at a basketball arena may block calls from the user's boss. Once the preferences and settings have been chosen and stored in 304 the method proceeds to 306.

As a user enters a building or other location with a call notification system 100 the system detects the presence of a mobile device 110 which has call notification implemented. At about the same time the mobile device 110 also detects the presence of the call notification system 100. The detection may be achieved by operating the mobile device 110 to continually sniff for available systems, and detect when the mobile device 110 comes within boundary 101 of a call notification system 100. In some embodiments a means for detecting the mobile device 110 is integrated into the access point 104 of the call notification system 100. The access point 104 may detect mobile devices sniffing for access points and initiating a request to register with the system. Alternatively, the call notification system 100 may employ directional antennas, low level signals, or other means to aid in detecting mobile devices and to ensure that the mobile device does not mistakenly detect entry into a notification system when it is actually outside the notification boundary 101. The notification boundary 101 is also characterized in that one or more of the notification displays 106 or notification speakers 108 are presented to the user within the notification boundary 101. Once the user is within the boundary 101 and the mobile device 110 has detected the call notification system 100 the method proceeds from 306 to 308.

In 308 the mobile device 110 negotiates with call notification system 100 and registers with the system. At least part of the process of negotiating entails establishing a local communication link, including any handshaking or communication registration processes required to establish the link. The negotiating process may also include providing the call notification system 100 with user preferences and caller information. Such preferences may include the type of notification devices and scheme to be employed while the user is within the call notification boundary 101 of call notification system 100. In some embodiments, after the system 100 has been initially detected in 306, the mobile device 110 need not take any special measures to register with the system 100 until an incoming call is received. In other embodiments, however, the mobile devices 110 within the notification boundary 101 are registered with the call notification system 100 so that the notification display/audio resources of the system can be fairly allocated. For example, if there are a great number of mobile devices 110 registered and incoming calls are being received at a high frequency, the system 100 may adapt by scrolling the notification information more quickly across television screens. Having the mobile devices 110 registered may allow the notification system 100 to better manage the display resources. In some instances the user of a mobile device 110 may opt not to use the call notification system 100 even though it is available. In such instances this is communicated to the system 100 during the negotiation and registration process, and the mobile device 110 may either be registered as inactive or may decline to be registered.

For mobile devices 110 which opt to be registered and use the services of call notification system 100, once the negotiation and registration of 308 is completed, the method proceeds to 310 to wait for an incoming call. The incoming call may either be a telephone call, a push-to-talk (PTT) communication, a page or other like type of wireless communication. In 312 it is determined whether an incoming call has been received and the caller associated with the incoming call is recognized, for example, using caller ID. Typically, a mobile device 110 receives a data packet, a page or other data from the MSC 182 indicating an incoming telephone call. If, in 312, it is determined that no incoming call has been received the method proceeds to 324 along the "NO" branch to determine whether the mobile device is leaving the call notification system—that is, leaving the notification boundary 101. If, in 324, the mobile device is not leaving the system, the method loops back to 310 in accordance with the "NO" branch from 322 to again wait for an incoming call. Back in 312, upon making a determination that an incoming call has been received the method proceeds from 312 along the "YES" branch to 314.

In 314 the mobile device waits a predetermined number of rings before having the call notification system 100 display a notification of an incoming call. Generally, the number of predetermined rings to wait before displaying an incoming call notification message is one of the options set up in 304. In some implementations the predetermined number of rings may be set to zero. The mobile device 110 may wait a different number of predetermined rings for the various different classifications of incoming callers (e.g., the display notification may be delayed three rings for standard class callers and only one ring for priority callers). The different classifications of incoming callers may have varying notification schemes associated with them which use a different combination of notification displays 106 and/or notification speakers 108 turned on at one or more preselected numbers of rings. For example, an incoming priority caller may cause a notification message to be scrolled across a television screen after one ring, and after four rings an announcement over the PA system may be made for the incoming priority call. Although block 314 is explained in terms of waiting a predetermined number of rings, the amount of time delayed before continuing with the method may be expressed in terms of a measure of time. A predetermined number of rings may be fractional (e.g., 3.25 rings), or may be converted to seconds, minutes or any other measure of time.

In 314, after the predetermined number of rings passes the method proceeds to 316 where it is determined whether the call has been answered by the user. If the call has already been answered the method proceeds to 322 in accordance with the "YES" branch. Other than block 322, the other activities depicted in FIG. 3 are performed before an incoming call has been answered, that is, while the mobile device is in the on-hook state. Block 322 is performed after the call has been answered, with the mobile device off-hook. In 322 the call notification system 100 ends the presentation of any notification messages. For example, the notification controller 102 controls the notification displays 106 and notification speakers 108 to discontinue any presentation of the incoming call notification. Upon ending the call notification in 322 the method proceeds to 324. Back in 316 if it is determined that the call has not been answered the method proceeds from 316 to 318 along the "NO" branch. In 318 the mobile device 110 instructs call notification system 100 to present the notification message, for example, using either notification displays 106, or notification speakers 108 or a combination of both. As mentioned previously, the notification scheme may employ a combination of displays 106 and notification speakers 108 which present the incoming call notification either simultaneously or at staggered times. For example, the notification display 106 may display the message after three rings, and if the user does not pick up the call the notification speakers 108 may make an announcement after five rings. Further, incoming caller's caller ID may be displayed or announced, or the incoming caller may be identified in the notification message using an alias specified by the user. The use of incoming caller aliases is useful in maintaining the user's privacy.

Once the incoming call notification message has been presented in 318, either visually using notification displays 106 or audibly using notification speakers 108, the method proceeds to 320 to determine whether the incoming call has ended. That is, in 320 it is determined whether the user's mobile device 110 is still ringing with the incoming call. The call may have ended if the incoming caller hung up or if the incoming call was directed to a voice mail system or the call was transferred after a certain number of rings. If, in 320, it is determined that there is still an incoming call which is ringing, the method loops back to 316 via the "YES" branch to 316 to again determine if the call has been answered. However, if it is determined in 320 that the call has ended the method proceeds to 324 via the "NO" branch.

In 324 it is determined whether the mobile device 110 has left the call notification system 100. This may occur if the user leaves the notification boundary 101 (e.g., leaves the building), or if the user logs out of the system, sets the mobile device 110 for no call notification, or turns the mobile device 110 off. If the mobile device has not left the call notification system the method proceeds from 324 to 310 along the "NO" branch to wait for an incoming call. Upon leaving the call notification system 100 the mobile device 110 may, in some embodiments, take steps to cancel the registration, log off, or otherwise notify the system that the mobile device is leaving. In 324, once the user has left the call notification system 100 the method proceeds from 322 along the "YES" branch to 326 where the method ends.

Various steps may be included or excluded as described above, or performed in a different order, with the rest of the activities still remaining within the scope of at least one exemplary embodiment. For example, block 318 may entail a notification scheme which provides instructions for presenting the incoming call notification to multiple notification displays 106 and notification speakers 108 beginning after a certain number of rings. In such a case the method need not proceed from 316 along the "NO" branch back to 316 more than once for a particular call. Instead the flowchart of FIG. 3 could be configured such that the "NO" branch from 316 proceeds directly to 320 on a second pass and subsequent passes for a particular incoming call (not shown).

The processing units, processors and controllers described herein (e.g., mobile device controller 116 of FIG. 1 and call notification controller 102 of FIG. 2) may be of any type capable of performing the stated functions and activities. For example, a processor may be embodied as a microprocessor, microcontroller, DSP, RISC processor, or any other type of processor that one of ordinary skill would recognize as being capable of performing the functions described herein. A processing unit in accordance with at least one exemplary embodiment can operate computer software programs stored (embodied) on computer-readable medium, e.g. hard disk, CD, flash memory, ram, or other computer readable medium as recognized by one of ordinary skill in the art, or the computer software programs may be transmitted wirelessly to the processing unit. The computer software programs can aid or perform the steps and activities described above. For example computer programs in accordance with at least one exemplary embodiment may include: source code for detecting the presence of a mobile device 110, source code for determining an ambient noise level and predetermined threshold value, source code for negotiating and registering with the call notification system 100, source code for detecting an incoming call, source code for presenting the call notification message, source code for ending the call notification, and source code for unregistering a user upon leaving the call notification system. There are many further source codes that may be written to perform the stated steps and procedures above, and these are intended to lie within the scope of exemplary embodiments.

The word "exemplary" in this disclosure is intended to mean that the embodiment or element so described serves as an example, instance, or illustration, and is not necessarily to be construed as preferred or advantageous over other embodiments or elements. The description of the invention provided herein is merely exemplary in nature, and thus, variations that do not depart from the gist of the invention are intended to be within the scope of the embodiments of the present invention. Such variations are not to be regarded as a departure from the spirit and scope of the present invention.

What is claimed is:

1. A call notification system for a mobile device in an environment inhospitable for call notification coupled to a wireless communication system via a first wireless communication link, the system comprising:
   an access point configured to establish a second wireless communication link with the mobile device;
   one or more notification devices configured to present a notification message of an incoming call for the mobile device; and
   a controller connected to the access point and to said one or more notification devices;
   wherein the controller is configured to control said one or more notification devices to present the notification message in response to the mobile device receiving data via the first communication link with an indication of the incoming call;
   wherein the access point is configured to negotiate with the mobile device via the second communication link in response to the mobile device entering a call notification boundary without user intervention.

2. The call notification system of claim 1, wherein the second wireless communication link is a Bluetooth link.

3. The call notification system of claim 1, further comprising:
   a sensor configured to detect an ambient noise level;
   wherein the controller is configured to disable said one or more notification devices if the ambient noise level is less than a predetermined threshold.

4. The call notification system of claim 1, wherein said one or more notification devices are configured to present the notification message a predetermined number of rings after the mobile device receives the indication of the incoming call.

5. The call notification system of claim 4, wherein said one or more notification devices further comprise:
   notification display; and
   notification speaker.

6. The call notification system of claim 4, further comprising:
   a memory configured to store call notification preferences;
   wherein the call notification preferences specify the predetermined number of rings.

7. The call notification system of claim 6,
   wherein the call notification preferences specify a list of incoming callers associated with a priority classification and a notification scheme for the priority classification.

8. The call notification system of claim 7, wherein the predetermined number of rings is a first predetermined number of rings;
   wherein the priority classification is for priority callers; and
   wherein the notification scheme specifies use of the notification display after the first predetermined number of rings and use of the notification speaker after a second predetermined number of rings.

9. The call notification system of claim 1, wherein the second wireless communication link is configured to send a signal from the mobile device to the access point indicating the incoming call.

10. A method for providing an indication of an incoming call for a mobile device in an environment inhospitable for call notification, the method comprising:
    detecting, at a call notification system, the mobile device which is coupled to a wireless communication system via a first wireless communication link;
    establishing a second wireless communication link between the call notification system and the mobile device;
    receiving data via the first wireless communication link indicating the incoming call;
    ringing the mobile device in response to receiving the data; and
    instructing the call notification system to wait a predetermined number of rings before displaying the notification of the incoming call;
    wherein the negotiation with the call notification system is conducted in response to the detection of the call notification system and without user intervention.

11. The method of claim 10, wherein the second wireless communication link is a Bluetooth link.

12. The method of claim 10, further comprising:
    negotiating with the mobile device on a second wireless communication link, the mobile device having entered a call notification boundary; and
    providing the call notification system with call notification preferences;
    wherein the call notification preferences specify the predetermined number of rings.

13. The method of claim 12, wherein the call notification preferences specify a list of incoming callers associated with a priority classification and a notification scheme associated with said priority classification.

14. The method of claim 13, wherein the predetermined number of rings is a first predetermined number of rings;
    wherein the priority classification is for priority callers; and
    wherein the notification scheme specifies use of a notification display after the first predetermined number of rings and use of a notification speaker after a second predetermined number of rings.

15. The method of claim 10, further comprising:
    sending a signal from the mobile device to the call notification system via the second wireless communication link indicating the incoming call.

16. A method of providing notification of an incoming call in an environment inhospitable for call notification, the method comprising:
    establishing a first wireless communication link with a wireless communication system;
    entering a call notification boundary;
    detecting a call notification system;
    establishing a second wireless communication link with the call notification system in response to the entry of said call notification boundary;
    negotiating with the call notification system on the second wireless communication link;
    receiving data via the first wireless communication link indicating the incoming call;
    ringing the mobile device in response to receiving the data; and
    instructing the call notification system to display the notification of the incoming call after a predetermined number of rings.

17. The method of claim 16, wherein the negotiating comprises:
  providing the call notification system with call notification preferences;
  wherein the call notification preferences specify the predetermined number of rings; and
  wherein the call notification preferences specify a list of incoming callers associated with a priority classification.

18. The method of claim 17, wherein the predetermined number of rings is a first predetermined number of rings;
  wherein the priority classification is for priority callers; and
  wherein the notification scheme specifies use of a notification display after the first predetermined number of rings and use of a notification speaker after a second predetermined number of rings.

19. The method of claim 16, wherein the negotiation with the call notification system is conducted in response to the detection of the call notification system and without user intervention.

20. The method of claim 16, further comprising:
  sending a signal from the mobile device to the call notification system via the second wireless communication link indicating the incoming call.

* * * * *